Figure 1:
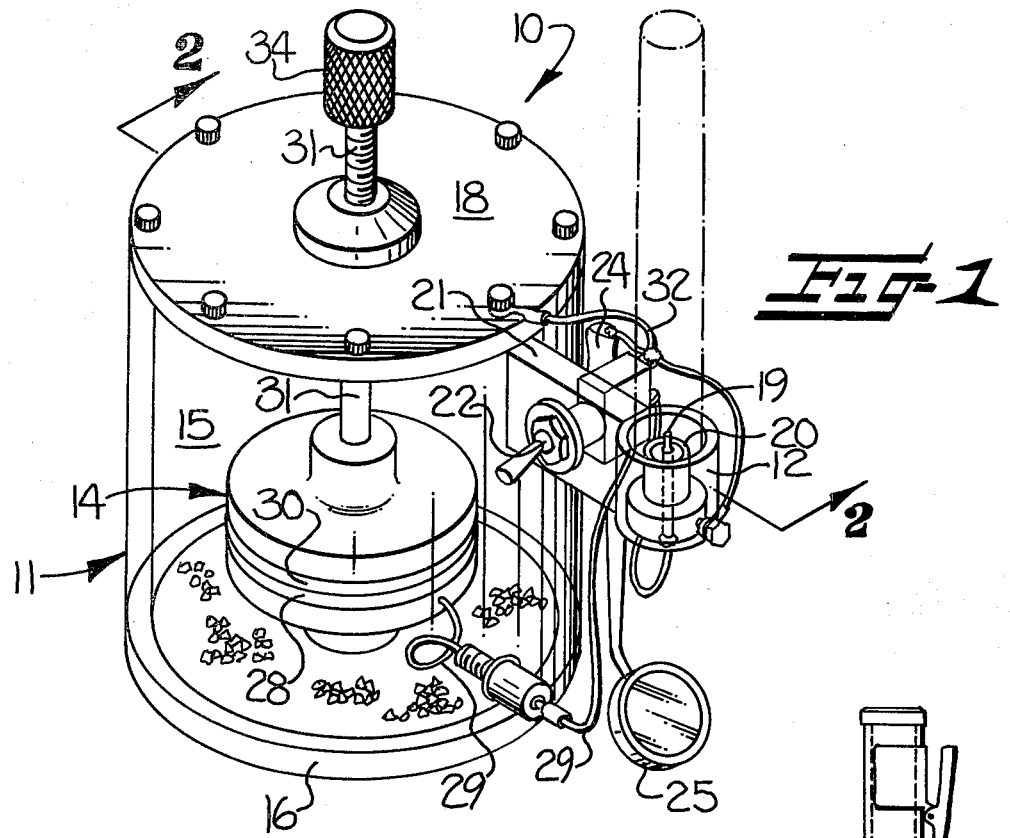

United States Patent [19]

Coover

[11] 4,207,471
[45] Jun. 10, 1980

[54] RADIATION DOSIMETER CHARGER AND METHOD

[75] Inventor: Stephen R. Coover, Chapel Hill, N.C.

[73] Assignee: Research Triangle Institute, Research Triangle Park, N.C.

[21] Appl. No.: 901,690

[22] Filed: May 1, 1978

[51] Int. Cl.² .............................................. G01T 1/18
[52] U.S. Cl. .................................... 250/377; 250/378
[58] Field of Search ............... 250/376, 377, 378, 388; 324/109

[56] References Cited

U.S. PATENT DOCUMENTS

| | | | |
|---|---|---|---|
| 2,753,463 | 7/1956 | Stout et al. | 250/378 |
| 2,765,413 | 10/1956 | Andrews | 250/377 |
| 2,859,354 | 11/1958 | Hollmann | 250/378 |

Primary Examiner—Alfred E. Smith
Assistant Examiner—Janice A. Howell
Attorney, Agent, or Firm—Bell, Seltzer, Park & Gibson

[57] ABSTRACT

A charger for ion chamber radiation dosimeters and a method of charging such dosimeters in which a dosimeter to be charged is received in a socket having electrical terminals for applying to the dosimeter an electrical charging potential developed by an electret.

10 Claims, 2 Drawing Figures

RADIATION DOSIMETER CHARGER AND METHOD

Persons who work with radioactive materials or in environments where exposure to radiation may occur are familiar with radiation dosimeters. In one form, intended for carrying in a pocket, radiation dosimeters allow a wearer to intermittently monitor his total radiation exposure. One well known form of such a dosimeter is a direct reading dosimeter of the type having a fiber electrometer and an ion chamber. Such pocket ion chamber radiation dosimeters are also stored in large numbers for use under circumstances of nuclear catastrophes. Such radiation dosimeters must be charged before use, by the application of an electrical potential to the elements of the ion chamber which essentially form a capacitor.

Heretofore, pocket ion chamber radiation dosimeters have been charged by portable or emergency charger devices employing various forms of "dry" cells. The useful storage life of such a charger is limited by the shelf life of the cell employed, and thus the cells must be replaced periodically when chargers are stored for extended periods of time. Further, with certain types of cells which are subject to leakage after the shelf life has expired, a charger stored for an extended period of time is subject to damage.

One alternative to a chemically based electrical source is a source based upon physical effects such as electrostatic field generation by a friction generator or by an electret. Friction generators rely upon electrostatic potential generated by friction between a moving element and a stationary element. An electret is a permanently polarized dielectric material—the electrostatic analog of a permanent magnet. Both have been proposed for charging ion chambers.

Electrets have been known since the latter part of the 19th century and a substantial amount of work has been done on them, with a few practical applications having been made. Electrets may be formed from certain waxes, resins, and synthetic polymers that exhibit extremely low electrical conductivity in the solid state. Once a charge on an electret has stabilized, the electret exhibits remarkable charge stability under conditions of ambient temperatures and low humidity. Stability of up to 12 years has been reported, and there is no evidence that an electret properly stored (that is, in a desiccated, ambient temperature atmosphere with shorted electrodes) will ever lose its charge. When applied as described hereinafter, the electret itself supplies no energy—the energy comes from the external work done against the electric field of an electret in moving the electrodes of the electret. Thus, an electret provides an ideal means for charging radiation dosimeters which require only a modest charge.

Hollmann U.S. Pat. No. 2,859,354, describes a radiation dosimeter designed with an integral electret-charging mechanism wherein charging of the dosimeter is claimed to be accomplished by inverting the dosimeter in one instance and, in another, moving the electret into position by raising it with an externally operated magnet. The Hollmann devices are believed to be inoperable as described.

While electrets, as described above, are generally in sheet form with the charges disposed on opposite surfaces of the sheet, it should be possible to make one in block form as depicted in the Hollmann patent. Assuming this is possible, the top surface 18 of electret 17 in FIG. 1 would have one polarity and the bottom surface (adjacent to the lower surface 22 of the container 15) would have the opposite polarity. When the unit is inverted to charge the dosimeter, surface 18 moves into proximity with electrode 26 of container 25 as is necessary, but there is no similar electrode adjacent to the bottom surface of the electret to complete the electric field circuit and thus only fringe field charging can occur. Such charging is quite insufficient for a radiation dosimeter as shown. Even assuming that means could be provided to overcome this objection, the illustrated embodiment does not provide a method of adjusting the amount of charge imparted to the ion chamber or electrometer—an absolute necessity for a useful device.

In addition, the Hollmann disclosure suffers mechanical deficiencies in that the continuing ability of the mechanical pin 54 to make reliable contact with surface 55 at precisely the same predetermined point in the charging cycle, as necessary for charging to a reproducible value, is seriously questioned. While Hollmann recognizes the need for short-circuiting the electret surfaces with a "keeper" to prevent self-depolarization of the electric field, he places the short-circuit between the sides of the electret rather than between surface 18 and the bottom surface. Thus, the electret would depolarize with time.

Figure 2:
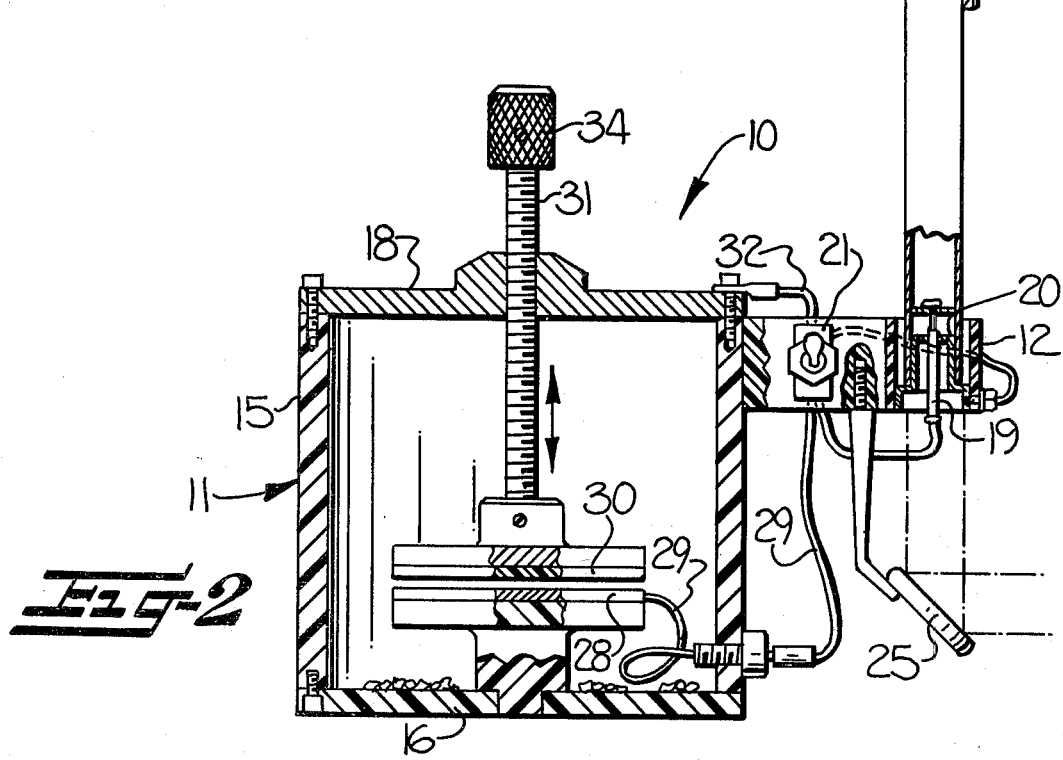

The above remarks also apply to the embodiment of FIG. 2 of Hollmann. Thus, the invention of Hollmann is clearly inoperable as described and, even if means could be provided to make it operable, it has design defects which make it not useful for the purpose intended.

The present invention overcomes the defects in the electret charging concept of Hollmann and provides a practical charger for radiation dosimeters. In particular, it is necessary that the charger be capable of delivering an adjustable charge because radiation dosimeters have different electrical capacities. As persons familiar with pocket ion chamber radiation dosimeters and chargers used with such dosimeters are aware, individual dosimeters among a group of substantially identical dosimeters will have variations in individual charging requirements. That is, while all dosimeters of the group will accurately reflect dosages of radiation within acceptable tolerances, the electrical potential required for charging the ion chamber of the dosimeter to a zero exposure condition will vary to a greater or lesser extent from one dosimeter to another.

Having in mind the aforementioned characteristics of pocket ion chamber radiation dosimeters and chargers therefor as have been used prior to the present invention, it is an object of this invention to obviate problems of storage life with radiation dosimeter chargers. In realizing this object of the present invention, a charging potential is derived from a generator means as distinguished from a chemically based battery. Due to the reliance upon physical effects rather than upon chemical reactions, proper operation of the charger of the present invention is achieved virtually independently of the length of any period of inactivity or non-use of the charger.

Yet a further object of the present invention is to charge pocket ion chamber radiation dosimeters in accordance with a method in which the dosimeter to be charged is electrically connected with an electrostatic potential generator in the form of an electret. The electrostatic potential generated by the electret is then adjustably increased while the charing of the dosimeter to a required condition is observed. In realizing this object of the present invention, variations in individual dosimeters being recharged are readily accommodated while each individual dosimeter is charged to the necessary and appropriate degree.

Yet a further object of the present invention is to provide for adjustably increasing and decreasing the level of a generated charging electrostatic potential to be applied to a pocket ion chamber radiation dosimeter. In realizing this object of the present invention, the level of a charging potential generated by an electret is controlled by adjustably increasing and decreasing the separation of the electret from a cooperating electrode.

Some of the objects of the invention having been stated, other objects will appear as the description proceeds, when taken in connection with the accompanying drawings, in which FIG. 1 is a perspective view of a dosimeter charger in accordance with the present invention; and FIG. 2 is an elevation view, in partial section, through the charger of FIG. 1, taken generally along the line 2—2 in that figure.

While the radiation dosimeter charger of the present invention will be described more particularly hereinafter with reference to the accompanying drawings, it is to be understood at the outset of the following description that it is contemplated that persons skilled in the applicable arts will be able to modify the apparatus and method in various ways while still embodying the essence of the present invention. Accordingly, the drawings and description are to be taken as a broad teaching directed to persons skilled in the applicable arts, and not as limiting upon the scope of this invention.

A charger for self-reading pocket ion chamber radiation dosimeters in accordance with the present invention is illustrated generally in FIGS. 1 and 2 at 10. The charger includes a housing means 11 for containing a desiccated atmosphere, socket means generally indicated at 12 for receiving a dosimeter to be charged and having electrical terminal means for applying to the received dosimeter an electrical charging potential, and electrostatic potential generating means, preferably in the form of an electret apparatus generally indicated at 14. The electrostatic potential generating means is electrically connected with the terminals in the socket 12 for applying a generated potential through the terminals and thereby for charging a received dosimeter. As described more fully hereinafter, means are provided for adjustably increasing and decreasing the level of the generated charging electrostatic potential in accommodation of variations in the charging requirements of various dosimeters.

Preferably, the housing 11 is formed by a tube 15 of an electrically insulating, transparent plastic material closed at one end by a cap 16 of insulating material and at the other end by a cap 18 of conductive material. The housing 11 is thus sealed to contain an atmosphere, which may be desiccated by the inclusion within the housing of appropriate moisture adsorbent crystals (FIG. 1). The socket 12, enclosing a center terminal 19 and an encircling outer terminal 20, is mounted to the housing 11 by suitable means such as a short mounting bar 21. The mounting bar 21 serves as a convenient place for mounting a control switch 22 and a capacitor 24, described more fully hereinafter. The mounting bar 21 additionally mounts means, in the form of a mirror 25, for directing light toward a dosimeter received by the socket 12 for charging, so as to facilitate observation of the state of charging of a dosimeter undergoing charging.

A dosimeter is indicated in phantom lines in FIG. 1 and in full lines in FIG. 2. Dosimeters of the type illustrated are generally well known to persons working in radiation measurement and are available from a number of instrument manufacturers. Typically, direct reading pocket ion chamber dosimeters have a built-in fiber electrometer and ion chamber on which a charge is impressed. A zero position on the built-in scale, read by holding the dosimeter to the eye in the manner of a telescope, indicates that the dosimeter is fully charged. Radiation passing through the ion chamber causes the charge on the chamber to leak off, in proportion to the amount of radiation exposure and causing movement of the electrometer fiber. A wearer carrying such a dosimeter is able to read total radiation exposure at any given time, without the need of a separate readout device. The ion chamber of such a dosimeter is charged by connection with the terminals 19, 20 of the socket 12, as described more fully hereinafter.

As briefly mentioned above, the electrostatic potential generating means generally indicated at 14 preferably comprises an electret. An electret is a permanently electrically polarized dielectric material—the electrostatic analog of a permanent magnet. The preparation of electrets is well described in available technical literature and accordingly will not be described at length here. It is sufficient to an understanding of this invention to state that any composition exhibiting a permanent electrical polarization may be used as described hereinafter.

In the present invention, the electret forming the electrostatic potential generating means 14 includes a stationary electrode 28 electrically connected by a suitable conductor 29 with the switch 22 and thence to one of the terminals 19, 20. An electret 30, formed generally in accordance with known techniques as described hereinabove, is mounted on a threaded shaft 31 for separation from the electrode 28. By means of the threaded shaft 31, the conductive cap 18 and a suitable conductor 32 extending to the switch 22, the electret 30 may be electrically connected to the other of terminals 19, 20. Thus, an electrostatic potential generated by separating the electret 30 from the electrode 28 may be applied through terminals 19, 20 to a dosimeter undergoing charging. The threaded shaft 31, by means of a knurled handle 34, provides a means for adjustably increasing and decreasing the level of the generated charging electrostatic potential, by controlling separation between the electret 30 and electrode 28.

It is known that the electrostatic potential generated when an electret and its electrode are separated will increase until a "saturation" potential is reached. The saturation potential is a function of electret surface charge density, electret area, and the system capacitance. Potentials less than the maximum practical potential can be controllably achieved by decreasing the electret-electrode separation or increasing the capacitance across the electret and electrode. Separation, as described hereinabove, may be achieved by axial separation (as illustrated in FIGS. 1 and 2) or by lateral translation. Lateral translation may be accomplished by sliding the electret and cooperating electrode across and away from each other or by fastening one of the members eccentrically to a shaft so that lateral separation occurs as the shaft is rotated. In the event that the separation distance between the electret and a cooperating electrode is fixed, system capacitance may be varied by placing a variable capacitor across the electret or by inserting a dielectric material between the separated electret and electrode. Similarly, the maximum output potential delivered may be limited by placing a fixed capacitor across the electret and electrode. The capacitor 24 (FIG. 1) electrically connected across the switch 22 may, if desired, serve such a function. The switch 22 may, if desired, serve the function of shorting the electret so as to prevent depolarization when the charger is not in use.

It is additionally known that the ion chamber of a dosimeter undergoing charging (which functions essentially as an external capacitor) may be charged to a controlled potential by incremental charge transfer. Incremental charge transfer can be accomplished by using as the switch 22 a double pole-double throw switch and using one pole to connect a capacitor such as the capacitor 24 in such a manner that the capacitor alternately is charged from the electret and electrode and discharged to the dosimeter, and the other pole connected to short the electret during storage. Such an approach to charging will accomplish the charging of any size external capacitor to the maximum output potential of the generator, thereby opening the possibility of accommodating still further variations in dosimeters.

When stored, the charger of FIGS. 1 and 2 normally has the electret 30 and electrode 28 brought into engagement one with another and shorted by means of the switch 22 or an externally attached jumper cable. In use, a dosimeter to be charged is electrically connected with the electrostatic potential generator 14 by being inserted into the socket 12 for engagement with the terminals 19, 20. The charger is then oriented with respect to a light source in such a manner that the mirror 25 directs light upwardly through the socket 12 and the dosimeter undergoing charging, permitting an operator to view the dosimeter scale through the dosimeter during the charging process. Any short across the electret is removed, and the electrostatic potential generated by the generator 14 is then adjustably increased by rotating the knurled knob 34 and threaded shaft 31, separating the electret 30 from the electrode 28. Irrespective of whether direct charging or incremental charge transfer is employed, the charging of the dosimeter to its required condition is observed. Upon the dosimeter being charged to its required condition, it is disconnected from the generator 14 by being removed from the socket 12. The charger 10 may then either be restored to its shorted, storage condition or employed to charge further dosimeters. As will be appreciated, control over separation between the electret 30 and the electrode 28 during these charging procedures provides accurate control over the increasing and decreasing of the electrostatic potential applied to the dosimeter, and thus over the charging of the ion chamber of the dosimeter to the required condition.

In the drawings and specification, there has been set forth a preferred embodiment of the invention, and although specific terms are employed, they are used in a generic and descriptive sense only and not for purposes of limitation.

That which is claimed is:

1. A charger for ion chamber radiation dosimeters comprising:
    socket means for receiving a dosimeter to be charged and having electrical terminal means for applying to a received dosimeter an electrical charging potential, and
    electrostatic potential generating means for generating an electrostatic potential and electrically connected with said terminal means for applying a generated potential through said terminal means and thereby for charging a received dosimeter, said generating means having an electret and means for adjustably increasing and decreasing the separation of said electret and thereby adjustably increasing and decreasing the level of the generated charging electrostatic potential in accommodation of variations in the charging requirements of various dosimeters.

2. A charger according to claim 1 wherein said means for adjustably increasing and decreasing charging potential comprises manually operable means for adjusting electret separation.

3. A charger according to claim 1 wherein said means for adjustably increasing and decreasing charging potential comprises means for varying electrical capacitance imposed on said electret.

4. A charger according to claim 1 wherein said means for adjustably increasing and decreasing charging potential comprises capacitance means electrically interposed between said electret and said terminal means for incremental charge transfer from said electret to said terminal means.

5. A charger for pocket ion chamber radiation dosimeters comprising:
    socket means for receiving a dosimeter to be charged and having a pair of electrical terminal means for applying to a received dosimeter an electrical charging potential,
    an electrode electrically connected to one of said terminal means,
    an electret electrically connected to the other of said terminal means, and
    means mounting said electrode and said electret in predetermined relation one to the other for generating an electrostatic potential therebetween and thereby for applying an electrostatic charging potential through said terminal means to a received dosimeter, said mounting means having manually operable means for adjustably increasing and decreasing the separation of said electrode and said electret and thereby adjustably increasing and decreasing the level of the generated charging electrostatic potential.

6. A charger according to claim 5 further comprising switch means electrically connected with said electrode and said electret for selectively imposing an electrical short across said electret.

7. A charger according to claim 5 further comprising means mounted in predetermined relation to said socket means for directing light toward a dosimeter received thereby for charging, said light directing means facilitating observation of the state of charging of the dosimeter undergoing charging.

8. A charger according to claim 5 further comprising capacitor means electrically connected across said electrode and said electret for limiting the maximum electrostatic charging potential generated.

9. A charger for pocket ion chamber radiation dosimeters comprising;
    housing means for containing a desiccated atmosphere,
    electrode means mounted within said housing means, electret means mounted within said housing means in predetermined relation to said electrode means, means for adjustably varying the separation between said electrode and said electret and thereby adjustably increasing and decreasing the level of an electrostatic potential generated therebetween, socket means mounted on said housing means for receiving a dosimeter to be charged, and a pair of electrical terminal means mounted in said socket means for applying to a received dosimeter an electrostatic charging potential, one of said terminal means being electrically connected to said electrode and the other of said terminal means being electrically connected to said electret.

10. A method of charging a pocket ion chamber radiation dosimeter comprising the steps of electrically connecting a dosimeter to an electrode and an electret mounted in spaced relation to the electrode for generating an electrostatic potential, then adjustably increasing and decreasing the separation of the electrode and the electret for thereby adjustably increasing and decreasing the electrostatic potential generated thereby while observing the charging of the dosimeter to a required condition, and then disconnecting the charged dosimeter from the electrode and the electret.

* * * * *

UNITED STATES PATENT AND TRADEMARK OFFICE
CERTIFICATE OF CORRECTION

PATENT NO. : 4,207,471
DATED : Jun. 10, 1980
INVENTOR(S) : Stephen R. Coover

It is certified that error appears in the above—identified patent and that said Letters Patent are hereby corrected as shown below:

Column 2, Line 68, delete "charing" and insert therefor - charging -.

Column 4, Line 43, after the word "of" insert the word - the -.

Signed and Sealed this

Twenty-first Day of October 1980

[SEAL]

Attest:

SIDNEY A. DIAMOND

Attesting Officer

Commissioner of Patents and Trademarks